United States Patent [19]
Adams

[11] Patent Number: 6,129,946
[45] Date of Patent: Oct. 10, 2000

[54] POWDER COATING APPARATUS AND METHOD FOR SUPPLYING AND MIXING POWDER IN A COATING APPARATUS

[75] Inventor: Horst Adams, St. Gallen, Switzerland

[73] Assignee: Wagner International AG, Alstatten, Switzerland

[21] Appl. No.: 09/252,024

[22] Filed: Feb. 16, 1999

[30] Foreign Application Priority Data

Mar. 2, 1998 [DE] Germany ............ 198 08 765

[51] Int. Cl.[7] .................................. B05D 1/12
[52] U.S. Cl. ................ 427/8; 427/9; 427/180; 427/426; 427/444; 427/478; 118/312
[58] Field of Search ................ 427/9, 201, 426, 427/444, 478, 180, 8; 118/693, 602, 312

[56] References Cited

U.S. PATENT DOCUMENTS

| | | | |
|---|---|---|---|
| 3,791,341 | 2/1974 | Diamond et al. | 118/7 |
| 5,743,958 | 4/1998 | Shutic | 118/308 |
| 5,756,164 | 5/1998 | Horinka et al. | 427/475 |
| 5,800,615 | 9/1998 | Lambert et al. | 118/326 |

FOREIGN PATENT DOCUMENTS

| | | |
|---|---|---|
| 195 81 792 T1 | 9/1997 | Germany . |
| 44 06 046 C2 | 11/1997 | Germany . |
| 196 22 429 A1 | 12/1997 | Germany . |
| 196 23 121 A1 | 12/1997 | Germany . |
| 196 50 112 C1 | 5/1998 | Germany . |
| 196 06 453 C2 | 7/1998 | Germany . |
| 197 13 668 A1 | 10/1998 | Germany . |
| 197 20 005 C1 | 11/1998 | Germany . |

*Primary Examiner*—Shrive Beck
*Assistant Examiner*—Michael Barr
*Attorney, Agent, or Firm*—Fenwick & West LLP

[57] ABSTRACT

The invention provides a powder coating apparatus, comprising a fresh powder container for receiving fresh powder, a recovery container for receiving powder recovered from the coating process, and a mixing container, which is connected to the fresh powder container and the recovery container via a first powder line and a second powder line, and comprising a control means for adjusting the mass flow rates of powder flowing in the first and the second powder line at a predetermined ratio of fresh powder and recovered powder. A first powder mass sensor is provided in or at the first powder line, and a second powder mass sensor is provided in or at the second powder line, wherein the control means is coupled with the first and the second powder mass sensor to adjust the ratio of the mass flow rates of powder flowing in the first and the second powder line. First of all fresh powder is supplied into the mixing container via the first powder line until a predetermined filling level is reached; the fresh powder is then substantially completely supplied to the coating device and is sprayed there; excess powder is collected and supplied to the recovery container; when a predetermined filling level is reached in the recovery container, the recovered powder and the fresh powder are substantially simultaneously supplied into the mixing container.

11 Claims, 2 Drawing Sheets

POWDER COATING APPARATUS AND METHOD FOR SUPPLYING AND MIXING POWDER IN A COATING APPARATUS

FIELD OF THE INVENTION

The present invention relates to a powder coating apparatus and a method for supplying powder to at least one coating device, in which fresh powder and recovered powder are mixed at a certain ratio, and the powder mixture formed thereby is supplied to the coating device.

BACKGROUND

It is usual in powder coating technology to collect excess powder, which does not adhere to the object to be coated, for instance by means of a suction means, in order to recover the powder and re-supply it in a powder cycle to the coating process. In powder coating apparatus, in which coatings of highest quality are to be produced, it is important to know at which ratio fresh and recovered powder is supplied to the supply container of the powder coating guns. A reason for this is the different grain spectra (i.e. the grain size distribution) of the powder particles of fresh and recovered powder. When the suction means operates for instance with a cyclone, as described in the German patent application 197 20 005, the finest portions are filtered out of the powder so that the recovered powder has an average grain spectrum that is coarser than that of the fresh powder. In order to obtain a desired grain spectrum the mixing ratio of fresh and recovered powder should be adjustable.

A relatively complicated method for measuring and regulating this mixing ratio is described in DE 195 81 792 C1. According to this method, fresh and recovered powder is transported at a selected ratio from a main container, or a regenerator container, to a mixing container and is mixed there. The mixing ratio is detected by mathematically predicting the particle size distribution of the powder contained in the mixing container so that the fine portions of the powder in the mixing container do not exceed a predetermined maximum percentage. The determination of the mixing ratio is made on the basis of measurements of the particle size distribution of the pure powder coating material and the particle size distribution of the regenerate.

In a further embodiment described in DE 195 81 792 C1, the pure powder and the excess powder are supplied at a selected ratio from the main container and the regenerate container to the mixing container while the levels in the main container and in the regenerate container do not fall below a minimum level. Additionally, a compensation powder line between the regenerate container and the main container is provided to maintain the desired minimum filling level. The filling levels in the main and regenerate container are detected by means of load cells, which support the container.

SUMMARY OF THE INVENTION

The object of the invention is to provide a powder coating apparatus and a method for supplying powder to at least one coating device in a powder coating apparatus in which fresh powder and recovered powder are mixed and supplied to the coating device, wherein the correct ratio between fresh and recovered powder shall be detected and adjusted in an uncomplicated and quick manner.

According to a first aspect of the invention, a powder coating apparatus is provided which comprises a fresh powder container for accommodating fresh powder, a recovery container for accommodating powder recovered from the coating process, and a mixing container which is connected to the fresh powder container via a first powder line and to a recovered powder container via a second powder line. A control means serves for setting the powder mass flows in the first and the second powder line at a certain ratio, wherein a first powder mass sensor is provided at the first powder line and a second powder mass sensor is provided at the second powder line, and the control means is coupled with the first and the second powder mass sensor to detect and adjust the ratio of the powder mass flows in the first and the second powder line. By directly measuring the powder mass flow supplied to the mixing container, the current mixing ratio can be determined directly and in simple manner, thus it can also be controlled.

Preferably, the powder mass flow leaving the mixing container is also determined; for this purpose a third powder line is provided for supplying coating powder from the mixing container to at least one coating device at which a third powder mass sensor is attached. In this case the control means is also coupled to the third powder mass sensor and is able to determine the powder filling level in the mixing container in response to the signals of the first, second and third powder mass sensors from the difference of the incoming and outgoing powder quantities. In an alternative embodiment, the level in the mixing container can be detected directly by a powder level sensor in the mixing container.

It is further provided in the invention to derive a maximum value for the ratio of the mass flows of the fresh and the recovered powder in response to the signals from the third powder mass sensor and a fourth powder mass sensor that is arranged in a return line extending from a recovery apparatus to a recovery container. In other words, it is the ratio of the quantity of the powder in total supplied to the coating device to the quantity of the recovered powder that is determined in order to know the portion of the available recovery powder to the total powder need and to feed substantially the entire recovered powder back into the coating cycle, if this is acceptable in view of the coating quality.

According to a further aspect of the invention, a powder coating apparatus is provided which has means for inspecting the surface of a coated object, which generates a surface measuring signal which is passed on to a control means to regulate the powder mass flow from the mixing container to at least one coating device in response to the surface measuring signal. The control means also receives an actual powder quantity signal, which represents the quantity of the powder actually supplied from the mixing container to the coating device. A control means suitable for the invention is described in the German patent application 197 13 668, which is incorporated by reference.

The means for inspecting the surface is preferably a coating thickness measuring means. Suitable coating thickness measuring means are described in the German patent applications 196 06 453 and 196 23 121, which are incorporated by reference. The surface inspecting means may also be a means for determining the characteristic of a workpiece surface, as described in the German patent application 196 22 429, which serves as the priority for U.S. Pat. No. 5,978,750, which is incorporated by reference.

The invention further provides a method for supplying powder to at least one coating device in a powder coating apparatus, in which fresh powder and recovered powder are supplied via first and second powder lines to a mixing container and are mixed at a certain ratio, and in which the powder mixture formed in this way is supplied to the coating device, wherein the powder mass flows in the first and second powder lines are determined to set the ratio of fresh and recovered powder.

In practice the method according to the invention preferably proceeds as follows. First, fresh powder is supplied into the mixing container via the first powder line until a predetermined filling level is reached; the fresh powder is then substantially completely passed on to the coating device and is sprayed there; excess powder is collected and supplied to a recovery container; when a predetermined level is reached in the recovery container, the recovered powder and the fresh powder are supplied to the mixing container in the predetermined ratio and substantially simultaneously.

BRIEF DESCRIPTION OF THE DRAWINGS

The invention and its preferred embodiments are further described with reference to the drawings.

DETAILED DESCRIPTION OF THE INVENTION

Figure 1:
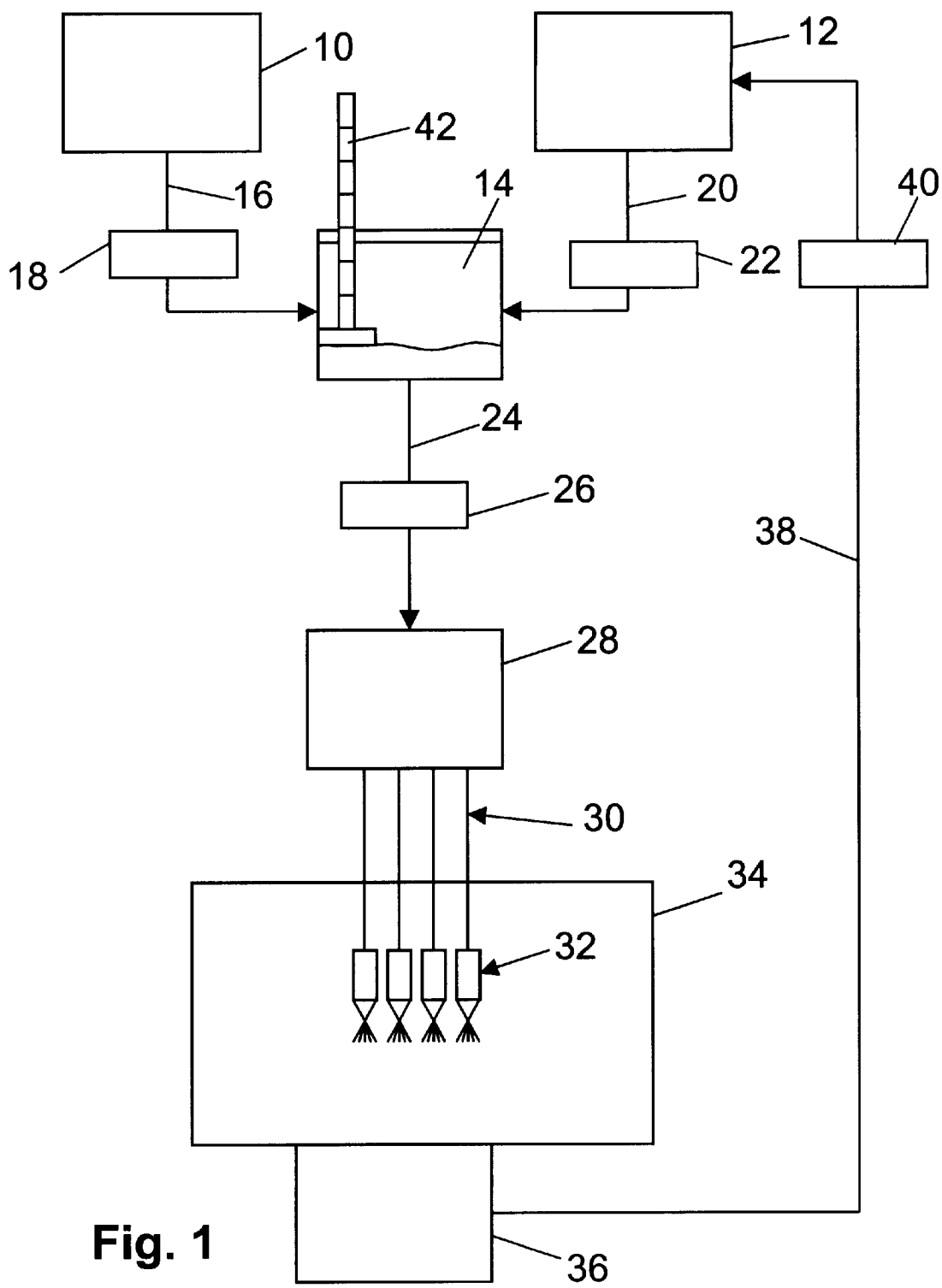
FIG. 1 is a schematic view of the powder cycle in the powder coating apparatus according to the invention.

A fresh powder container 10 for fresh coating powder, a recovery container 12 for recovered coating powder and a mixing container 14 are shown in FIG. 1. The fresh powder container 10 and the mixing container 14 are connected to one another through a first line 16 in which a first powder mass sensor 18 is arranged; and the recovery container 12 and the mixing container 14 are connected via a second line 20, in which a second powder mass sensor 22 is arranged. The mixing container 14 is connected to a gun supply container 28 via a third powder line 24 in which a third powder mass sensor 26 is arranged. A plurality of powder supply lines 30 lead from the gun supply container 26 to a plurality of coating guns 32 in a coating compartment 34. A recovery system 36 for excess powder is provided at the coating compartment 34. The recovery system may for instance be a suction means having a cyclone separator, as described in the German patent application 197 20 005, which is incorporated by reference. A fourth powder line 38 leads from the recovery system 36 to the recovery container 12, with a fourth powder mass sensor being arranged in the fourth powder line. Finally, a level probe 42 for determining the powder filling level within the mixing container is provided in the mixing container 14.

The powder mass sensors 18, 22, 26 and 40 may be provided as described in the German patent applications 44 06 046 and 196 50 112. These applications are incorporated by reference.

The supply of fresh powder, recovered powder and mixed powder through the powder lines 16, 20, 24, 30 and 38 is conducted through pneumatic supply means (not shown), which comprise air quantity controllers, as they are for instance described in the German patent application 197 13 668, which are incorporated by reference.

In a preferred embodiment of the invention the powder cycle shown in FIG. 1 operates as follows: Fresh powder is supplied from the fresh powder container 10 via the first powder line into the mixing container 14. The powder quantity supplied is measured by the powder mass sensor 18. The level probe 42 in the mixing container measures the filling level in the container, wherein the mixing container 14 is first of all filed only to about 50%; then the supply of fresh powder to the mixing container 14 is turned off.

The powder from the mixing container 14 is substantially fully supplied through the third powder line 24 into the powder supply container 28. The supplied powder quantity is detected by the powder mass sensor 26. When the mixing container 14 is emptied completely, the supply to the gun supply container 28 is turned off.

Now the spray guns 32 in the coating compartment 34 start spraying the powder from the gun supply container 28, while a workpiece is carried through the coating compartment 34. Coating powder, which does not adhere to the workpiece is recovered by the recovery system 36, which is for instance a suction system having a cyclone separator, or a filter, and supplied via the fourth powder line 38 to the recovery container 12. The powder quantity re-supplied through the fourth powder line 38 is detected by the fourth powder mass sensor 40. As soon as a sufficient powder quantity exists in the recovery container, the powder supply from the recovery container 12 through the second powder line 20 into the mixing container 14 is turned on. The powder quantity supplied through the second powder line 20 is detected by the second powder mass sensor 22.

The powder supply from the fresh powder container 10 through the first powder line 16 into the mixing container 14 takes place basically simultaneously with the turn-on of the powder supply from the recovery container 12 into the mixing container 14.

The quantities of the supplied fresh and recovered powder can be detected and compared by means of the first and second powder mass sensors 18, 22, in order to adjust the supply quantities in a manner that a selectable, constant mixing ratio of fresh and recovered powder is maintained.

The mixing ratio can be selected on the basis of different considerations. As described in the introduction, the powder particles of the fresh powder and the recovered powder have different grain spectra, i.e. grain size distributions, because for instance a cyclone separator of the recovery system filters out the fine particles from the powder. Since the type of recovery apparatus is known in practice, a mixing ratio can be determined based on experimental values, for instance 1:3 (recovered to fresh powder), by which an acceptable total grain spectrum of the powder mixture is obtained. The maximum mixing ratio, i.e. the maximum proportion of recovered powder, depends on the coating efficiency in the coating compartment 27. That means in case of a bad coating efficiency, a greater amount of excess powder (up to 50% of the fresh powder) will reach the recovery apparatus 36. In case of a favorable coating efficiency, the amount of recovered powder is only approximately 20 to 30% of the supplied fresh powder quantity. A further criterion for adjusting the ratio of recovered and fresh powder can therefore be to supply possibly the entire recovered coating powder to the powder cycle, and to add as much fresh powder as required to provide a sufficient total powder quantity.

The coating efficiency can be determined by a comparison of the powder quantity measuring values of the third powder mass sensor 26 and the fourth powder mass sensor 40, which provide a measure for the ratio of totally sprayed powder to recovered powder. In the prior art the sprayed powder quantity was weighted (by means of a balance at the powder container) and the workpiece was weighed before and after the coating process in order to the determine the coating efficiency. On the contrary, the invention offers a more simple and on-line realizable possibility of determining the coating efficiency.

The adjustment of the mixing ratio between fresh and recovered powder can be made manually or automatically, wherein in automatic operation the signals of the powder mass sensors 24 and 40 are evaluated in a control means (not shown) and the supply quantities are adjusted via air quantity controller at the pneumatic supply means (not shown).

In an alternative embodiment of the invention, the surface characteristic or coating thickness of a coated workpiece may alternatively or additionally be taken into consideration, as will be described later with reference to FIG. 2.

The filling level in the mixing container 14 is monitored by means of the level probe 42, so that it can be kept on a constant level by simultaneously controlling the powder supply from the fresh powder container 10 and the recovery container 12 at constant ratio of the two supply quantities. Thereby a constant mixing ratio of fresh and recovered powder can be easily maintained in the mixing container 14. The optimally mixed powder is then in continuous operation supplied to the gun supply container 28 via the third powder line 24 and is sprayed there by the spray guns 32.

The function of the level probe 42 is dispensable in continuous operation, since all intakes and discharges of the mixing container 14 can be measured by the powder mass sensors 18, 22, 24 in the first, second and third powder lines 16, 20, 24, respectively, so that a constant filling level and a desired mixing ratio can be ensured by suitable evaluation of these signals.

In practical application the level probe 42 is therefore only necessary for the initial filling of the mixing container 14 in order to ensure that the container is not overfilled. For this purpose the quantity measurement (in g/min) of the powder mass sensor 18 will usually not suffice, since coating powders have very different specific weights and, additionally, the increasing volume due to fluidization in the mixing container must be taken into consideration, which is required in any powder supply container, and which is particular responsible for a favorable mixing of the powder in the mixing container 14, as the person skilled in the art knows.

Thus, the invention provides a very simple and also effective system for recycling recovered coating powder, which is able of taking into consideration different points of view, such as an optimum grain spectrum of the powder mixture, optimal utilization of the recovered powder, surface characteristic of the workpiece etc.

Figure 2:
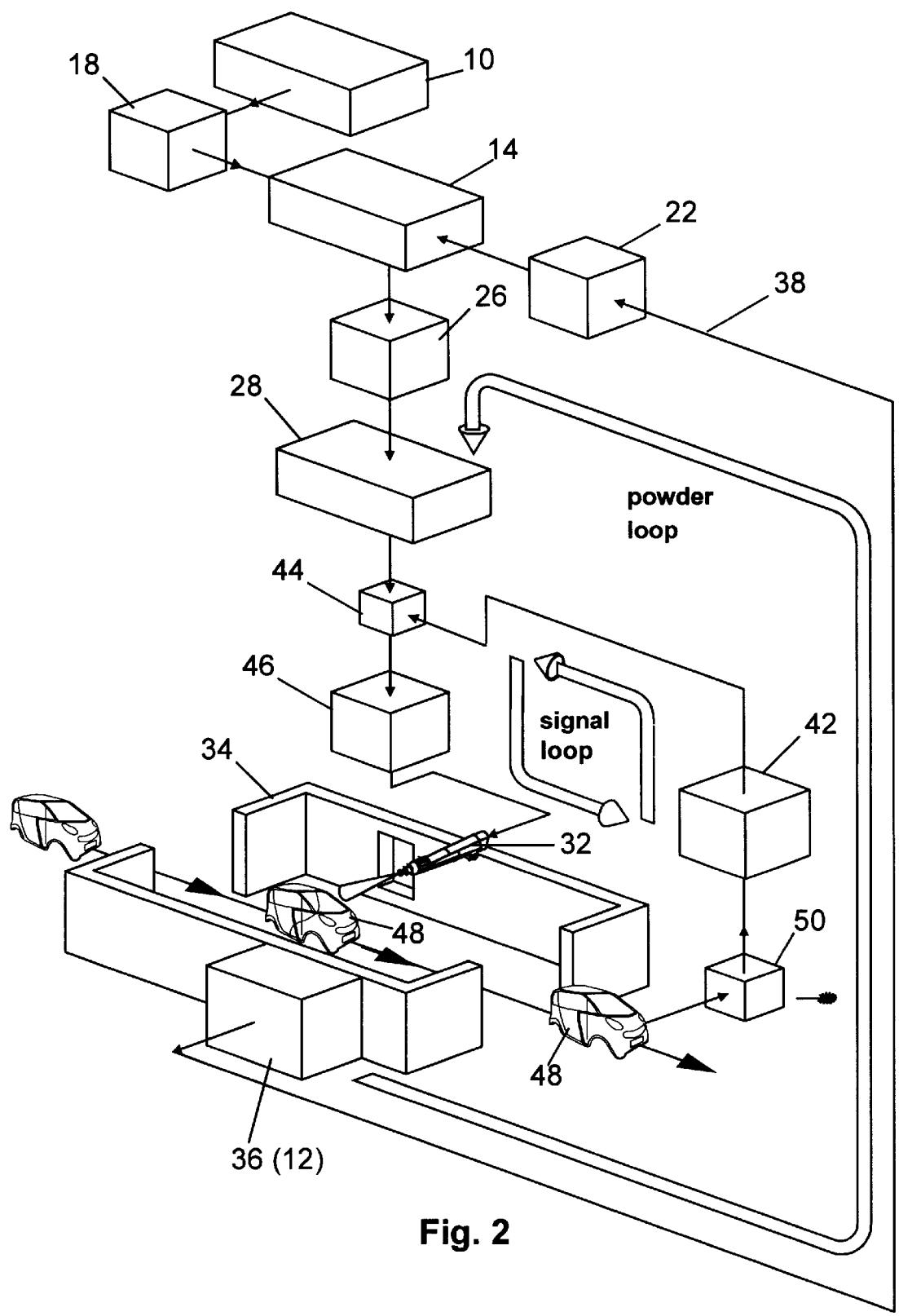
FIG. 2 is a schematic view of a preferred embodiment of the powder coating apparatus according to the invention.

With reference to FIG. 2, a powder coating apparatus according to a further embodiment of the invention is described. In FIG. 2 the corresponding components are designated by the same reference numerals as in FIG. 1, thus they are not explained once more.

The powder cycle shown in FIG. 2—consisting of the fresh powder container 10, the mixing container 14, the gun supply container 28, the coating guns 32, only one of which being shown for the sake of clarity, the recovery system 36 and the powder return line 38 to the mixing container—basically corresponds to the powder cycle of FIG. 1, with the difference that in FIG. 2 the powder recovery container 12 is integrated into the recovery system 36 and thus only one powder mass sensor 22 is provided for the returned powder. This power mass sensor additionally takes the function of the fourth powder mass sensor 40 of FIG. 1.

In addition to the powder cycle, the powder coating apparatus shown in FIG. 2 comprises a "signal loop", which basically serves for controlling the powder quantity sprayed by the coating guns 32.

The signal loop comprises a flow control device 42, an injector 44, preferably a calibrated Venturi injector, another powder mass sensor 46, the spray gun 32 (here only one spray gun is shown as an example, although in practice a plurality of spray guns may be provided) for discharging coating powder onto a workpiece 48 to be coated, and a means 50 for inspecting the surface of the coated workpiece 48, in particular a laser coating thickness measuring device.

The individual components of this signal loop are known from the prior art. A control means is for instance described in the German patent application 197 13 668, and is suitable for controlling the flow rate of the coating powder, suitable powder mass sensors are described in the German patent applications 4406 and 196 50 112, and a laser coating thickness measuring device is for instance known from the German patent applications 196 06 453 and 196 23 121 which are incorporated by reference.

The coating thickness measuring device 50 measures the thickness of the surface coating of a workpiece 38, said thickness being compared in the control means 42 with a limit value to possibly correct the quantity of the powder discharged by the coating gun 32 via the Venturi injector. The powder quantity actually discharged by the coating gun 32 is detected by the powder mass sensor 46, the output signal of which also being supplied to the control means 42.

In addition, the output signal can be used by the coating thickness measuring means 50 to adjust the mixing ratio of fresh and recovered powder (not shown). If for instance with a known sprayed powder quantity, a surface coating is not homogeneous, this can also be caused by an incorrect powder composition.

It might also be more favorable to—for instance—only increase the quantity of the fresh powder. The person skilled in the art of coating technology knows how to interpret the respective measuring results. As an alternative, a means for determining the surface characteristic of a workpiece (not shown) can be used, as it is for instance described in the German patent application 196 22 429, in order to check whether acceptable surfaces are obtained by the selected ratio of fresh and recovered coating powder, so as to possibly correct the ratio.

An especially efficient and also not very complex powder coating apparatus is provided by the inventive interleaving of the powder cycle for adjusting an optimum ratio of fresh and recovered powder with the signal cycle for adjusting an optimal total quantity of sprayed coating powder.

The features disclosed in the above description, the claims and the drawing can be meaningful individually and in any combination for realizing the invention in its various embodiments.

What is claimed is:

1. A method of supplying powder to at least one coating device (32) in a powder coating apparatus, in which fresh powder and recovered powder are mixed at a mixing ratio and are supplied to a mixing container (14), and the powder mixture formed thereby is supplied to the coating device (32), and in which the powder mass flows of the fresh powder and the recovered powder to the mixing container are detected by respective powder mass flow sensors (18, 22) to determine a current mixing ratio, the coating efficiency of the powder coating apparatus is determined, and the mixing ratio is controlled in response to a desired mixing ratio and the determined current mixing ratio, wherein a maximum mixing ratio of recovered powder to fresh powder is determined in response to the coating efficiency.

2. A method as claimed in claim 1, characterized in that the powder mass flow from the mixing container to the coating device is determined by a powder mass flow sensor.

3. A method as claimed in claim 2, characterized in that the powder filling level in the mixing container is determined in accordance with the powder quantities that are supplied to the coating device and that are recovered from the coating process.

4. A method as claimed in claim 1, characterized in that the coating efficiency is indicative of the ratio of powder quantities that are supplied to the coating device and that are recovered from the coating process.

5. A method as claimed in clam 1, characterized in that fresh powder is first filled into the mixing container until a predetermined filling level is reached; the fresh powder is supplied to the coating device for spraying thereby; excess powder is collected and supplied to a recovery container; and when a predetermined filling level is reached in the recovery container, the recovered powder and the fresh powder are supplied into the mixing container.

6. A method of supplying powder to at least one coating device (32) in a powder coating apparatus, in which fresh powder and recovered powder are mixed at a nixing ratio and are supplied to a mixing container (14), and the powder mixture formed thereby is supplied to the coating device (32), and in which the powder mass flows of the fresh powder and the recovered powder to the mixing container are detected by respective powder mass flow sensors (18, 22) to determine a current mixing ratio, a condition of the surface of a coated object is detected, and the mixing ratio is controlled in response to a desired mixing ratio and the determined current mixing ratio, wherein the desired mixing ratio is set in response to the detected surface condition of the coated object.

7. A method as claimed in claim 6, characterized in that the powder mass flow from the mixing container to the coating device is determined by a powder mass flow sensor.

8. A method as claimed in claim 7, characterized in that the powder filling level in the mixing container is determined in accordance with the powder quantities that are supplied to the coating device and that are recovered from the coating process.

9. A method as claimed in claim 6, characterized in that a maximum mixing ratio of recovered powder to fresh powder is determined in response to the ratio of powder quantities that are supplied to the coating device and that are recovered from the coating process.

10. A method as claimed in claim 6, characterized in that fresh powder is first filled into the mixing container until a predetermined filling level is reached; the fresh powder is supplied to the coating device for spraying thereby; excess powder is collected and supplied to a recovery container; and when a predetermined filling level is reached in the recovery container, the recovered powder and the fresh powder are supplied into the mixing container.

11. A method as claimed in claim 6, characterized in that coating thickness of a surface coating of the object is the surface condition that is detected.

* * * * *